United States Patent
Park et al.

(10) Patent No.: US 8,847,875 B2
(45) Date of Patent: Sep. 30, 2014

(54) LIQUID CRYSTAL DISPLAY AND DRIVING METHOD THEREOF

(75) Inventors: Jaedeok Park, Kyungbuk (KR); Sanghoon Kwon, Kyungbuk (KR)

(73) Assignee: LG Display Co., Ltd., Seoul (KR)

( * ) Notice: Subject to any disclaimer, the term of this patent is extended or adjusted under 35 U.S.C. 154(b) by 471 days.

(21) Appl. No.: 12/339,881

(22) Filed: Dec. 19, 2008

(65) Prior Publication Data

US 2009/0167675 A1 Jul. 2, 2009

(30) Foreign Application Priority Data

Dec. 27, 2007 (KR) .................. 10-2007-0138304

(51) Int. Cl.
| | |
|---|---|
| G09G 3/36 | (2006.01) |
| G02F 1/1345 | (2006.01) |
| G09G 3/34 | (2006.01) |
| G02F 1/133 | (2006.01) |

(52) U.S. Cl.
CPC .......... *G09G 3/3611* (2013.01); *G02F 1/13318* (2013.01); *G09G 2320/0626* (2013.01); *G09G 2320/0276* (2013.01); *G02F 1/13452* (2013.01); *G09G 2330/021* (2013.01); *G09G 3/3406* (2013.01); *G02F 2201/58* (2013.01); *G09G 2360/144* (2013.01)
USPC ....................................................... 345/102

(58) Field of Classification Search
USPC ....................................................... 345/102
See application file for complete search history.

(56) References Cited

U.S. PATENT DOCUMENTS

| | | | |
|---|---|---|---|
| 6,661,399 B1 * | 12/2003 | Oh et al. .................. | 345/87 |
| 8,031,167 B2 * | 10/2011 | Lee et al. ................ | 345/102 |
| 8,072,444 B2 * | 12/2011 | Ikeda et al. ............. | 345/204 |
| 2002/0011978 A1 * | 1/2002 | Yamazaki et al. ........ | 345/87 |
| 2003/0210221 A1 * | 11/2003 | Aleksic .................... | 345/102 |
| 2004/0195494 A1 * | 10/2004 | Kok et al. ........... | 250/214 AL |
| 2005/0087671 A1 | 4/2005 | Park | |
| 2005/0151065 A1 * | 7/2005 | Min .................... | 250/214 R |
| 2005/0231457 A1 * | 10/2005 | Yamamoto et al. ........ | 345/102 |
| 2005/0285973 A1 * | 12/2005 | Singh et al. ............. | 348/374 |
| 2006/0012543 A1 * | 1/2006 | Ikeda et al. ............. | 345/36 |
| 2006/0268299 A1 * | 11/2006 | Nose et al. .............. | 358/1.9 |

(Continued)

FOREIGN PATENT DOCUMENTS

| | | |
|---|---|---|
| JP | 2006-30392 A | 2/2006 |
| KR | 10-2005-0040296 A | 5/2005 |
| KR | 10-2006-0041436 A | 5/2006 |

*Primary Examiner* — Dorothy Harris

(74) *Attorney, Agent, or Firm* — Birch, Stewart, Kolasch & Birch, LLP

(57) ABSTRACT

A liquid crystal display is disclosed with a reduced thickness. According to an embodiment, the liquid crystal display device includes a liquid crystal panel including upper and lower substrates and divided into an effective display region and a non-display region adjacent to the effective display region; a backlight unit configured to supply light to the effective display region; a backlight driving unit configured to control an operation of the backlight unit; a driving IC configured to control data to be displayed in the effective display region; an illuminance sensor configured to sense light external to the liquid crystal display device; and a flexible printed circuit (FPC) on which the backlight driving unit is disposed, the driving IC and the illuminance sensor being disposed adjacent to each other in the non-display region over the lower substrate.

13 Claims, 7 Drawing Sheets

(56) References Cited

U.S. PATENT DOCUMENTS

2006/0274023 A1* 12/2006 Sultenfuss et al. ............ 345/102
2007/0035473 A1* 2/2007 Yamazaki et al. ................ 345/4
2007/0091057 A1* 4/2007 Lee et al. ...................... 345/102
2007/0146300 A1* 6/2007 Wu et al. ....................... 345/102
2008/0055231 A1* 3/2008 Nose et al. .................... 345/102
2008/0076273 A1* 3/2008 Jang ................................ 439/56

* cited by examiner

LIQUID CRYSTAL DISPLAY AND DRIVING
METHOD THEREOF

This application claims the benefit of Korea Patent Application No. 10-2007-0138304 field on Dec. 27, 2007, which is incorporated herein by reference for all purposes as if fully set forth herein.

BACKGROUND

1. Field

This document relates to a liquid crystal display, and more particularly, to a liquid crystal display which can be made slim while incorporating an illuminance sensor.

2. Related Art

In general, the scope of application of liquid crystal displays has widened due to the lightweight, thinness, and low power consumption of liquid crystal displays. According to this trend, liquid crystal displays are widely used in office automation machines and audio/video machines. The intensity of light beam is adjusted in accordance with a video signal applied to a plurality of control switches arranged in a matrix in order to display a desired picture on a screen.

Since such LCDs are non-emissive devices, the LCDs generally need a light unit such as a backlight unit. A light source for the backlight unit can include fluorescent lamps such as external electrode fluorescent lamps (EEFLs) and cold cathode fluorescent lamps (CCFLs), or a plurality of light emitting diodes (LEDs).

When using the fluorescent lamps as the backlight, device characteristics of the LCD may be easily deteriorated due to the high power consumption and high heat generation of the fluorescent lamps. In addition, the fluorescent lamps generally have a stick shape, so they do not withstand impacts well and can easily break on impact.

However, when the light emitting diodes are used as the backlight, since each light emitting diode is a semiconductor device, the lifetime of the LCD can be long, the lighting speed of the LCD can be fast, and the power consumption of the LCD can be low. The light emitting diode also withstands impacts well and miniaturization thereof is easy. Because of these benefits, there is an increasing trend that light emitting diodes are used in monitors having middle or large sized LCDs such as in computers or television sets, as well as in small sized LCDs such as in mobile telephones, as a light source.

Recently, there have been proposed LCD control methods in which the range of luminance of a displayed image can be enlarged by adjusting the brightness of the backlight and the gamma characteristics of output data. In these control methods, an illuminance sensor is mounted in a liquid crystal module to sense the illuminance of external light. Based on this sensing information, if the external illuminance is high, the amount of electric current supplied to the backlight is increased and the gamma characteristics of output data are increased, while if the external illuminance is low, the amount of electric current supplied to the backlight is decreased and the gamma characteristics of output data are lowered. By this, the power consumption of the backlight can be reduced, and the visibility for users can be greatly improved.

FIG. 1 is a schematic view of an illuminance sensor according to the related art.

As shown in FIG. 1, a conventional illuminance sensor 20 is generally manufactured in a package 24 type so that a sensor portion 26 can be easily exposed to the external light, and then mounted in a printed circuit board 22 (hereinafter, "PCB").

FIG. 2 shows a mobile phone which employs the illuminance sensor of FIG. 1.

As shown in FIG. 2, the mobile phone having an illuminance sensor 20 mounted in a PCB, senses external light through a hole 32, and adjusts the brightness of the backlight and the gamma characteristics of output data based on the sensed external light. However, in the case that a package type illuminance sensor is mounted in a PCB as seen in FIG. 1, it is necessary to provide much additional space for the mounting area of the illuminance sensor, which makes it difficult to produce slim liquid crystal displays, e.g., for use in mobile phones.

Moreover, the conventional liquid crystal display having a package type illuminance sensor mounted in the PCB has other disadvantages in that, because of spacing distances between the illuminance sensor and a driving integrated circuit (hereinafter, "driving IC") and between the illuminance sensor and a driving portion, additionally long wiring is needed in order to link or transmit the sensing information from the illuminance sensor to the driving IC and the backlight driving portion. This can complicate the configuration of liquid crystal displays, increase the cost of manufacturing liquid crystal displays, and limits manufacturing of slim liquid crystal displays.

SUMMARY

An aspect of this document is to provide a liquid crystal display which can be made slim while incorporating an illuminance sensor.

Another aspect of this document is to provide a liquid crystal display which reduces the length of a communication line for electrically connecting an illuminance sensor with a driving IC, and/or electrically connecting the illuminance sensor with a backlight driving portion of the liquid crystal display.

Another aspect of this document is to provide a liquid crystal display and a method of forming the same, which address the limitations and disadvantages associated with the related art.

Additional features and advantages of the exemplary embodiments of the invention will be set forth in the description which follows, and in part will be apparent from the description, or may be learned by practice of the exemplary embodiments of the invention. The objectives and other advantages of the exemplary embodiments of the invention will be realized and attained by the structure particularly pointed out in the written description and claims hereof as well as the appended drawings.

To achieve the above advantages, a liquid crystal display in accordance with one embodiment of the present invention comprises: a liquid crystal panel having an effective display region for displaying an image and a non-display region for not displaying the image; a backlight unit for radiating light on the back surface of the liquid crystal panel; an illuminance sensor for sensing external light radiated on the front surface of the liquid crystal panel; a driving IC for adjusting a gamma characteristic of data to be displayed on the liquid crystal panel based on sensing information from the illuminance sensor; a PCB for generating a driving signal required to drive the liquid crystal panel; a FPC for electrically connecting the PCB to the driving IC; a backlight driving portion for adjusting a driving current supplied to the backlight unit based on the sensing information from the illuminance sensor; and a communication line for electrically connecting between the illuminance sensor and the driving IC and between the illuminance sensor and the backlight driving portion, wherein the illuminance sensor is mounted on the non-display region by a COG method, and is arranged adjacent to the driving IC.

According to an embodiment, the driving IC is mounted on the non-display region by the COG method, and the backlight driving portion is mounted on the FPC by a SMT method. The communication line can be an I2C communication line.

A liquid crystal display in accordance with another embodiment of the present invention comprises: a liquid crystal panel having an effective display region for displaying an image and a non-display region for not displaying the image; a backlight unit for radiating light on the back surface of the liquid crystal panel; an illuminance sensor for sensing external light radiated on the front surface of the liquid crystal panel; a driving IC for adjusting a gamma characteristic of data to be displayed on the liquid crystal panel based on sensing information from the illuminance sensor; a PCB for generating a driving signal required to drive the liquid crystal panel; a FPC for electrically connecting the PCB to the driving IC, and having an extended portion extended from one side thereof so as to be overlapped with part of the non-display region; a backlight driving portion for adjusting a driving current supplied to the backlight unit based on the sensing information from the illuminance sensor; and a communication line for electrically connecting between the illuminance sensor and the driving IC and between the illuminance sensor and the backlight driving portion, wherein the illuminance sensor is mounted on the extended portion by a SMT method and is arranged adjacent to the driving IC on the non-display region.

A liquid crystal display in accordance with still another embodiment of the present invention comprises: a liquid crystal panel having an effective display region for displaying an image and a non-display region for not displaying the image; a backlight unit for radiating light on the back surface of the liquid crystal panel; an illuminance sensor for sensing external light radiated on the front surface of the liquid crystal panel; a driving IC mounted on the non-display region by a COG method to adjust a gamma characteristic of data to be displayed on the liquid crystal panel based on sensing information from the illuminance sensor; a PCB for generating a driving signal required to drive the liquid crystal panel; a FPC for electrically connecting the PCB to the driving IC; a backlight driving portion for adjusting a driving current supplied to the backlight unit based on the sensing information from the illuminance sensor; and a communication line for electrically connecting between the illuminance sensor and the driving IC and between the illuminance sensor and the backlight driving portion, wherein the illuminance sensor is mounted on the FPC by a SMT method, and is arranged on the FPC adjacent to the backlight driving portion.

A liquid crystal display in accordance with still another embodiment of the present invention comprises: a liquid crystal panel having an effective display region for displaying an image and a non-display region for not displaying the image; a backlight unit for radiating light on the back surface of the liquid crystal panel; an illuminance sensor for sensing external light radiated on the front surface of the liquid crystal panel; a driving IC mounted on the non display region by a COG method to adjust a gamma characteristic of data to be displayed on the liquid crystal panel based on sensing information from the illuminance sensor; a FPC electrically connected to the driving IC; a PCB mounted on the FPC to generate a driving signal required to drive the liquid crystal panel; a backlight driving portion for adjusting a driving current supplied to the backlight unit based on the sensing information from the illuminance sensor; and a communication line for electrically connecting between the illuminance sensor and the driving IC and between the illuminance sensor and the backlight driving portion, wherein the illuminance sensor is mounted on the PCB by a SMT method, and is arranged on the FPC adjacent to the backlight driving portion.

A liquid crystal display in accordance with still another embodiment of the present invention comprises: a liquid crystal panel including upper and lower substrates and divided into an effective display region and a non-display region adjacent to the effective display region; a backlight unit configured to supply light to the effective display region; a backlight driving unit configured to control an operation of the backlight unit; a driving IC configured to control data to be displayed in the effective display region; an illuminance sensor configured to sense light external to the liquid crystal display device; and a flexible printed circuit (FPC) on which the backlight driving unit is disposed, the driving IC and the illuminance sensor being disposed adjacent to each other in the non-display region over the lower substrate.

A liquid crystal display in accordance with still another embodiment of the present invention comprises: a liquid crystal panel including upper and lower substrates and divided into an effective display region and a non-display region adjacent to the effective display region; a backlight unit configured to supply light to the effective display region; a backlight driving unit configured to control an operation of the backlight unit; a driving IC disposed in the non-display region over the lower substrate and configured to control data to be displayed in the effective display region; an illuminance sensor configured to sense light external to the liquid crystal display device; and a flexible printed circuit (FPC) on which the backlight driving unit is disposed, the illuminance sensor and the backlight driving unit being disposed adjacent to each other over the FPC.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION

Hereinafter, embodiments of the invention will be described in detail with reference to FIGS. 3 to 8 as non-limiting examples.

Figure 1:
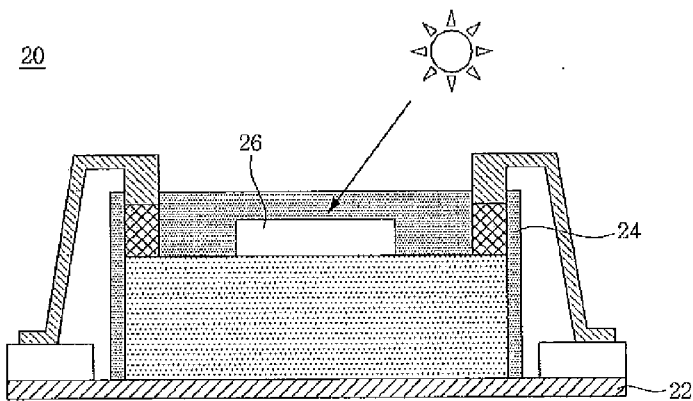
FIG. 1 is a schematic view of an illuminance sensor released according to the related art.
Figure 2:
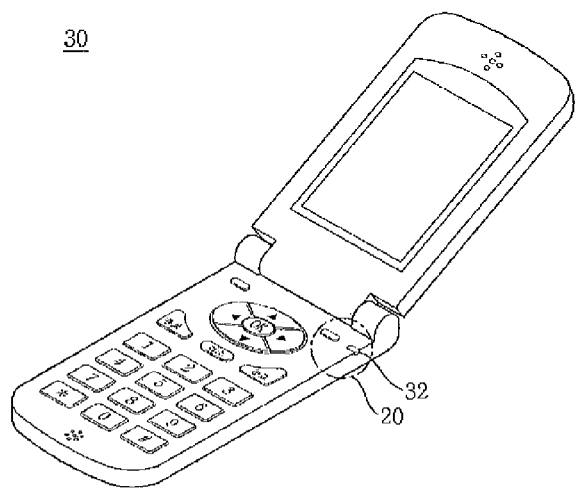
FIG. 2 shows a mobile phone employs the illuminance sensor of FIG. 1.
Figure 3:
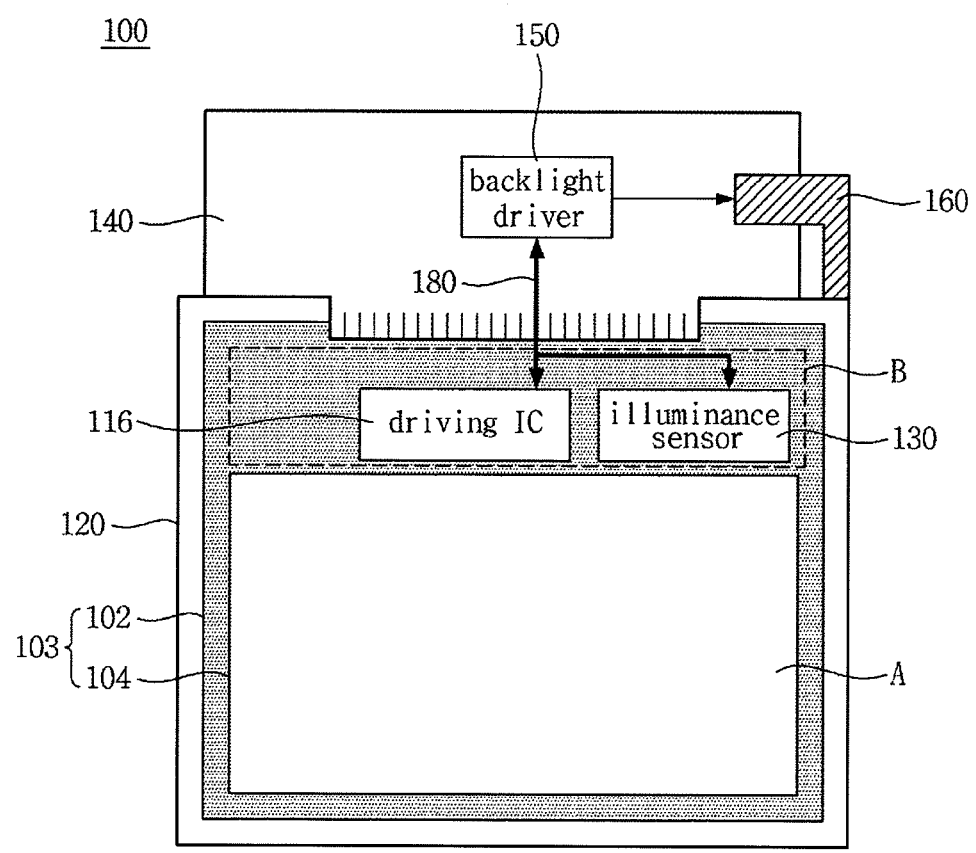
FIG. 3 is a plane view of a liquid crystal display in accordance with a first embodiment of the present invention.
Figure 4:
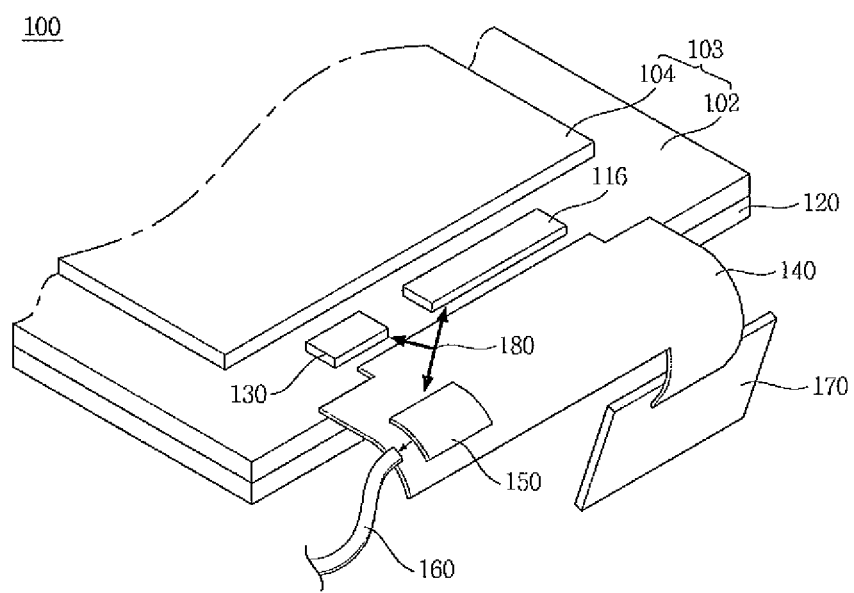
FIG. 4 is a perspective view of a portion of the liquid crystal device in accordance with the first embodiment of the present invention.

FIG. 3 is a plane view of a liquid crystal display in accordance with a first embodiment of the present invention. FIG. 4 is a perspective view of an example of a portion of the liquid crystal display of FIG. 3 in accordance with the first embodiment of the present invention.

Referring to FIGS. 3 and 4, a liquid crystal display 100 in accordance with the first embodiment of the present invention includes a liquid crystal panel 103, a backlight unit 120 for radiating light on the liquid crystal panel 103, an illuminance sensor 130 mounted on the liquid crystal panel 103 to sense external light, a driving IC 116 for adjusting gamma characteristic(s) of data to be displayed on the liquid crystal panel 103 based on sensing information from the illuminance sensor 130, a PCB 170 arranged on the back surface of the liquid crystal panel 103 to generate a drive signal for driving the liquid crystal panel 103, a flexible printed circuit (hereinafter, "FPC") for electrically connecting the PCB 170 to the driving IC 116 of the liquid crystal panel 103, and a backlight driving portion 150 mounted on the FPC 140 to adjust the brightness of the backlight unit 120 based on the sensing information from the illuminance sensor 130.

The liquid crystal display 100 further includes a bottom cover for housing and supporting the backlight unit 120 and a top case for covering the edges of the liquid crystal panel 103 and the sides of the bottom cover.

The liquid crystal panel 103 includes a spacer (not shown) for interposing liquid crystal between a lower substrate 102 and an upper substrate 104 and maintaining a constant gap between the upper substrate 104 and the lower substrate 102. Color filters, black matrices, and so on, are formed on the upper substrate 104 of the liquid crystal panel 103, but may be formed on the lower substrate 102 as needed. Signal lines, such as data lines and gate lines, are formed on the lower substrate 102 of the liquid crystal panel 103, and thin film transistors (hereinafter, "TFTs") are formed at intersections between the gate lines and the data lines. The TFTs switch a data signal to be transmitted toward the liquid crystal cell from the data lines in response to a scanning signal from the gate lines. Pixel electrodes are formed at pixel regions between the data lines and the gate lines. A common electrode facing the pixel electrodes may be formed on the upper substrate 104 or the lower substrate 102 depending on the method of applying an electric field to the liquid crystal cell. The liquid crystal panel 103 of this type and other types includes an effective display region A for displaying an image and a non-display region B for not displaying the image. The gray scale of the image displayed on the effective display region A can be differently implemented according to gate signals and data signals supplied from the driving IC 116 mounted on the non-display region B.

The driving IC 116 is preferably mounted on the non-display region B of the liquid crystal panel 103 by a chip-on-glass (hereinafter, referred to as "COG") method, but other suitable method may be used. Unlike a tape automated bonding (hereinafter, referred to as "TAB") method, the COG method is a method of directly mounting the driving IC 116 on the lower substrate 102 of the liquid crystal panel 103 for electrical conduction. The driving IC 116 adjusts the gamma characteristics of data to be displayed on the liquid crystal panel 103 based on sensing information from the illuminance sensor 130. In other words, to increase the visibility for users according to external illuminance, if the external illuminance is high, the driving IC 116 increases the gamma characteristics of output data based on the sensing information output from the illuminance sensor 130, while, if the external illuminance is low, it decreases the gamma characteristics of output data based on the sensing information from the illuminance sensor 130.

The illuminance sensor 130 is mounted, along with the driving IC 116, on the non-display region B of the liquid crystal panel 103, by preferably the COG method, but other suitable method may be used. Preferably, the illuminance sensor 130 is arranged adjacent to the driving IC 116 in order to reduce the length of a communication line(e.g., wiring, conductive lines, ect.) used in providing communications with he driving IC 116. The illuminance sensor 130 senses the external light (e.g., level of the external light) and thereby supplies sensing information according to the sensed external illuminance to the driving IC 116 and the backlight driving portion 150 through. e.g., an inter-integrated circuit (I2C) communication line 180.

The PCB 170 is arranged on the back surface of the liquid crystal panel 103 and generates a drive signal for driving the liquid crystal panel 103.

The FPC 140 includes a base film layer formed of, e.g., polyimide thereunder, a conductive layer formed of a conductive material having a predetermined width on top of the base film layer, and a cover film layer formed of, e.g., polyamide on top of the conductive layer. Other suitable materials of the FPC 140 may be used.

After the coupling of the liquid crystal panel 103 and the bottom cover, the FPC 140 is electrically connected to pad electrodes of the driving IC 116 by using an anisotropic conductive film (hereinafter, referred to as "ACF") as the medium. Further, the FPC 140 is curved twice at the sides of the coupled liquid crystal panel 103 and bottom cover, and then electrically connected to the PCB 170 arranged on the back surface of the bottom cover. For example, because the FPC 140 is flexible, the FPC 140 can start from the top of the lower substrate 102 and then wrap around one side of the lower substrate 102 and the backlight unit 120 to the back of the panel for connecting with the PCB 103 on the back of the panel.

The backlight driving portion 150 is mounted on the FPC 140 by preferably a SMT (Surface Mounting Technology), but other suitable method may be used. The backlight driving portion 150 is supplied with sensing information from the illuminance sensor 130 through the I2C communication line 180. The backlight driving portion 150 adjusts the amount of electric current supplied to the backlight unit 120 based on the sensing information. For example, to reduce the power consumed in the backlight unit 120, based on the sensing information from the illuminance sensor 130, if the external illuminance (e.g., surrounding light external to a device having the liquid crystal display, etc.) is detected to be high, the backlight driving portion 150 can increase the amount of electric current supplied to the backlight unit 120, while, if the external illuminance is detected to be low, it can decrease the amount of electric current supplied to the backlight unit 120. The backlight driving portion 150 supplies a backlight driving current to the backlight unit 120 through a drive signal supply line 160. In a non-limiting example, since the FPC 140 may wrap around the panel, the backlight driving portion 150 may be disposed on the FPC 140 on a front, side, or back side of the panel.

The backlight unit 120 can include a plurality of light sources for radiating light on the liquid crystal panel 103, a reflective sheet arranged at one sides of the light sources, a light guiding plate for converting the light incident from the light sources into surface light sources, and a plurality of optical sheets arranged between the liquid crystal panel 103 and the conductive plate. As the light sources, white LEDs (light emitting diodes) may be used. The reflective sheet plays the role of guiding the light generated from the light sources toward the liquid crystal panel 103, and the light guiding plate plays the role of converting the light from the light sources into surface light sources. The optical sheets play the role of vertically raising the light incident at an inclination from the surface of the reflective sheet and making the light proceed toward the liquid crystal panel 103. Other types of backlight unit can be used as the backlight unit 120.

The liquid crystal display 100 (and liquid crystal displays 200, 300, 400 to be discussed below) can include other components of conventional liquid crystal displays. All components of the liquid crystal display 100 (and liquid crystal displays 200, 300, 400) are operatively coupled and configured.

The above-described liquid crystal display in accordance with the first embodiment of the present invention has the driving IC 116 and the illuminance sensor 130 which are mounted adjacent to the non-display region B of the liquid crystal panel 103 by the COG method, and the backlight driving portion 150 mounted on the FPC 140 adjacent to the above components 116 and 130 by the SMT method. Consequently, the liquid crystal display in accordance with the first embodiment of the present invention is able to incorporate the illuminance sensor 130, has a slim thickness, and greatly reduces the length of the I2C communication line 180 for electrically connecting between the illuminance sensor 130 and the driving IC 116 and between the illuminance sensor 130 and the backlight driving portion 150.

Figure 5:
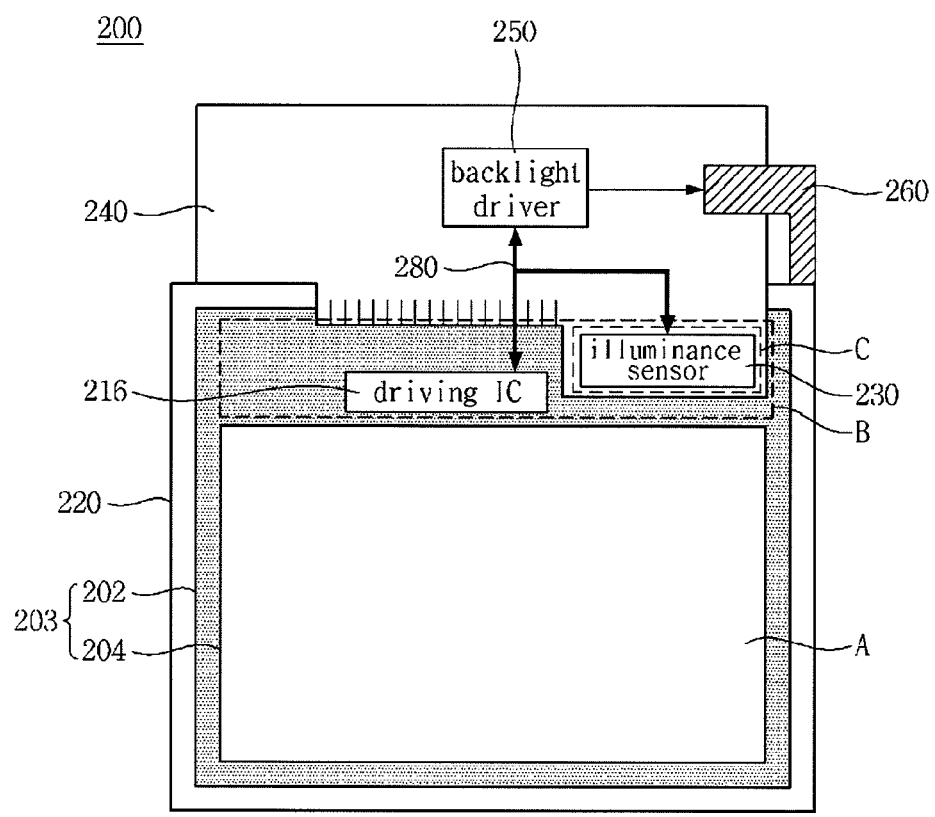
FIG. 5 is a plane view of a liquid crystal display in accordance with a second embodiment of the present invention.
Figure 6:
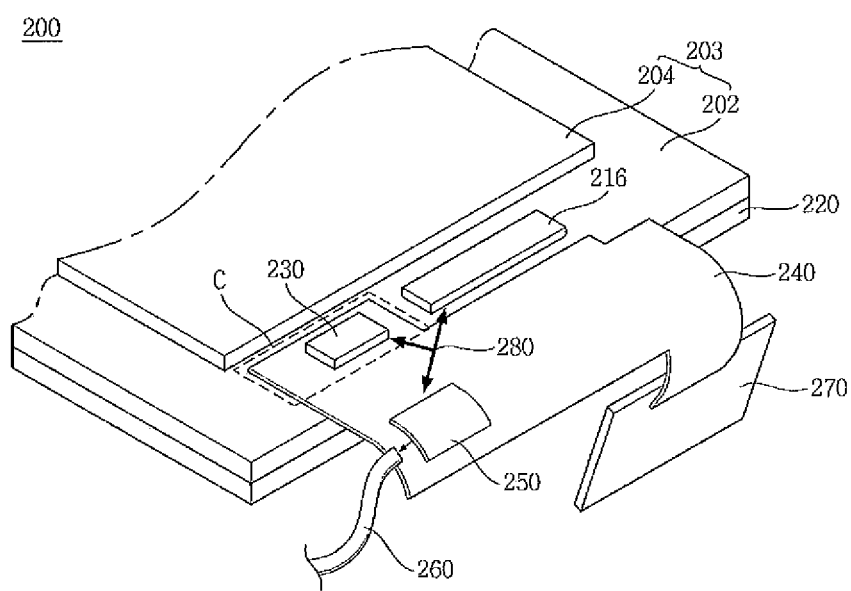
FIG. 6 is a perspective view of a portion of the liquid crystal display in accordance with the second embodiment of the present invention.

FIG. 5 is a plane view of a liquid crystal display in accordance with a second embodiment of the present invention. FIG. 6 is a perspective view of an example of a portion of the liquid crystal display of FIG. 5 in accordance with the second embodiment of the present invention.

Referring to FIGS. 5 and 6, the liquid crystal display 100 in accordance with the second embodiment of the present invention can include a liquid crystal panel 203, a backlight unit 220 for radiating light on the liquid crystal panel 203, an illuminance sensor 230 mounted on the liquid crystal panel 203 to sense external light, a driving IC 216 for adjusting gamma characteristic(s) of data to be displayed on the liquid crystal panel 203 based on sensing information from the illuminance sensor 230, a PCB 270 arranged on the back surface of the liquid crystal panel 203 to generate a drive signal for driving the liquid crystal panel 203, a FPC 240 for electrically connecting the PCB 270 to the driving IC 216 of the liquid crystal panel 203, and a backlight driving portion 250 mounted on the FPC 240 to adjust the brightness of the backlight unit 220 based on the sensing information from the illuminance sensor 230. The liquid crystal display 200 can further include a bottom cover for housing and supporting the backlight unit 220 and a top case for covering the edges of the liquid crystal panel 203 and the sides of the bottom cover.

The liquid crystal panel 203 includes a spacer for interposing liquid crystal between a lower substrate 202 and an upper substrate 204 and maintaining a constant gap between the upper substrate 204 and the lower substrate 202. Color filters, black matrices, and so on, which are not shown, can be formed on the upper and/or lower substrate 202, 204 of the liquid crystal panel 203. Signal lines, such as data lines and gate lines are formed on the lower substrate 202 of the liquid crystal panel 203, and TFTs are formed at intersections between the gate lines and the data lines. The TFTs switch a data signal to be transmitted toward the liquid crystal cell from the data lines in response to a scanning signal from the gate lines. Pixel electrodes are formed at pixel regions between the data lines and the gate lines. A common electrode facing the pixel electrodes may be formed on the upper substrate 204 or the lower substrate 202 depending on the method of applying an electric filed to the liquid crystal cell. The liquid crystal panel 203 of this type includes an effective display region A for displaying an image and a non-display region B for not displaying the image. The gray scale of the image displayed on the effective display region A is differently implemented according to gate signals and data signals supplied from the driving IC 216 mounted on the non-display region B.

The driving IC 216 is mounted on the non-display region B of the liquid crystal panel 203 by a COG method or other suitable method. Unlike a TAB method, the COG method is a method of directly mounting the driving IC 216 on the lower substrate 202 of the liquid crystal panel 203 for electrical conduction. The driving IC 216 adjusts the gamma characteristics of data to be displayed on the liquid crystal panel 203 based on sensing information from the illuminance sensor 230. In other words, to increase the visibility for users according to external illuminance, if the external illuminance is high, the driving IC 216 can increase the gamma characteristic of output data based on the sensing information from the illuminance sensor 230, while, if the external illuminance is low, it can decrease the gamma characteristic of output data based on the sensing information from the illuminance sensor 230.

The PCB 270 is preferably arranged on the back surface of the liquid crystal panel 203 and generates a drive signal for driving the liquid crystal panel 203.

The FPC 240 can be composed of a base film layer formed of, e.g., polyimide thereunder, a conductive layer formed of a conductive material having a predetermined width on top of the base film layer, and a cover film layer formed of, e.g., polyamide on top of the conductive layer. After the coupling of the liquid crystal panel 203 and the bottom cover, the FPC 240 is electrically connected to pad electrodes of the driving IC 216 by using an AFC as the medium.

Unlike the first embodiment, the FPC 240 has an extended portion C extended to a portion, other than the portion where the driving IC 216 is mounted, of the non-display region B. For instance, the illuminance sensor 230 is disposed directly on the extended portion C of the FPC 240 while the driving IC 216 (adjacent to the illuminance sensor 230) is not disposed directly on any portion of the FPC 240 but is disposed directly on a surface of the lower substrate 202. The illuminance sensor 230 can be mounted on the extended portion C by a SMT mounting method or other suitable method. Further, the FPC 240 is curved twice (e.g., wrapped around) at the sides of the coupled liquid crystal panel 203 and bottom cover, and then electrically connected to the PCB 270 arranged on the back surface of the bottom cover.

The illuminance sensor 230 can be mounted by the SMT mounting technology on the extended portion C of the FPC 240 overlapped and connected with the non-display region B of the liquid crystal panel 203. Preferably, the illuminance sensor 230 is arranged adjacent to the driving IC 216 in order to reduce the length of a communication line used in communication with the driving IC 216. The illuminance sensor 230 detects the external light and thereby generates and supplies sensing information according to the detected external light, to the driving IC 216 and the backlight driving portion 250 through an I2C communication line 280.

The backlight driving portion 250 is mounted on the FPC 240 by the SMT mounting technology, but may be disposed using other suitable method. The backlight driving portion 250 is supplied with the sensing information from the illuminance sensor 230 through the I2C communication line 280.

The backlight driving portion 250 adjusts the amount of electric current supplied to the backlight unit 220 based on the sensing information. In other words, to reduce the power consumed in the backlight unit 220 based on the sensing information from the illuminance sensor 230, if the external illuminance/light is detected to be high, the backlight driving portion 250 can increase the amount of electric current supplied to the backlight unit 220, while, if the external illuminance/light is detected to be low, the backlight driving portion 250 can decrease the amount of electric current supplied to the backlight unit 220. The backlight driving portion 250 supplies a backlight driving current to the backlight unit 220 through a drive signal supply line 260.

The backlight unit 220 can include a plurality of light sources for radiating light on the liquid crystal panel 203, a reflective sheet arranged at one sides of the light sources, a light guiding plate for converting the light incident from the light sources into surface light sources, and a plurality of optical sheets arranged between the liquid crystal panel 203 and the conductive plate. As the light sources, white LEDs (light emitting diodes) may be used. The reflective sheet plays the role of guiding the light generated from the light sources toward the liquid crystal panel 203, and the light guiding plate plays the role of converting the light from the light sources into surface light sources. The optical sheets play the role of vertically raising the light incident at an inclination from the surface of the reflective sheet and making the light proceed toward the liquid crystal panel 203. Other types of backlight unit may be used.

The above-described liquid crystal display in accordance with the second embodiment of the present invention has the driving IC 216 mounted by the COG method on the non-display region B of the liquid crystal panel 203, the illuminance sensor 230 mounted by the SMT method on the extended portion C of the FPC 240 extended to a portion, excluding the portion where the driving IC 216 is mounted, of the non-display region B, and the backlight driving portion 250 mounted on the FPC 240 adjacent to the above components 216 and 230 by the SMT method.

Consequently, the liquid crystal display in accordance with the second embodiment of the present invention is able to incorporate the illuminance sensor 230, has a slim thickness, and greatly reduces the length of the I2C communication line 280 used for electrically connecting between the illuminance sensor 230 and the driving IC 216 and between the illuminance sensor 230 and the backlight driving portion 250.

Figure 7:
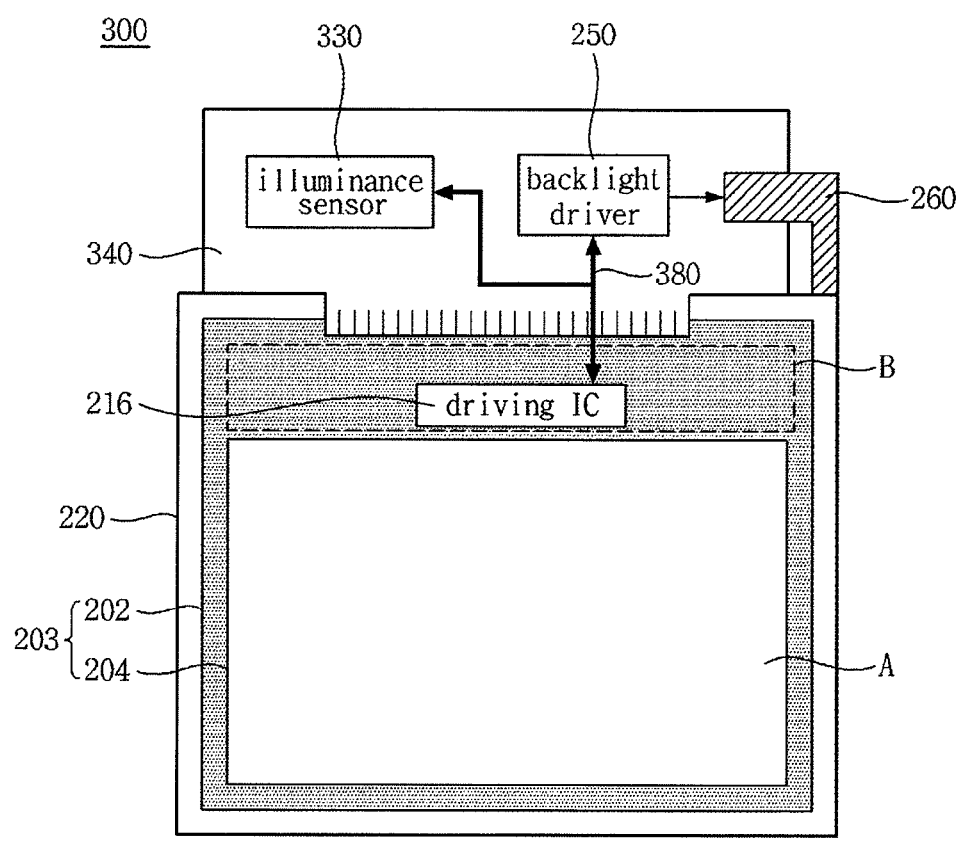
FIG. 7 is a plane view of a liquid crystal display in accordance with a third embodiment of the present invention.

FIG. 7 is a plane view of a liquid crystal display in accordance with a third embodiment of the present invention.

Referring to FIG. 7, the liquid crystal display 300 in accordance with the third embodiment of the present invention is substantially the same as the liquid crystal display 200 in accordance with the second embodiment, except for the shape of a FPC 340 and the mounting method and mounting position of an illuminance sensor 330. Thus, the other components are given the same reference numerals as those of the liquid crystal display 200 in accordance with the second embodiment, and a detailed description thereof will be omitted. The third embodiment may substitute for the second embodiment in the case that, in the second embodiment, the width of the region, other than the region where the driving IC 216 is mounted, of the non-display region B is too small to mount the illuminance sensor 330 thereon, or the height of the illuminance sensor 330 to be mounted is relatively greater than that of the driving IC 216.

The FPC 340 can include base film layer formed of, e.g., polyimide thereunder, a conductive layer formed of a conductive material having a predetermined width on top of the base film layer, and a cover film layer formed of, e.g., polyamide on top of the conductive layer. After the coupling of the liquid crystal panel 203 and the bottom cover, the FPC 340 is electrically connected to pad electrodes of the driving IC 216 by using an AFC as the medium.

Unlike the second embodiment, the FPC 340 has no extended portion C. Further, the FPC 340 is curved twice (wrapped around) at the sides of the coupled liquid crystal panel 203 and bottom cover, and then electrically connected to a PCB arranged on the back surface of the bottom cover. The backlight driving portion 250 is disposed on the FPC 340 and as a result, may be disposed on the top side of bottom side of the panel.

The illuminance sensor 330 is mounted by the SMT mounting technology or other suitable method on the FPC 340 not overlapped with the non-display region B of the liquid crystal panel 203. The illuminance sensor 330 can be arranged adjacent to or close to the driving IC 216 in order to reduce the length of a communication line used in communication with the driving IC 216. Further, the illuminance sensor 330 is disposed adjacent to the backlight driving unit 250, both on the FPC 340, outside the non-display region B. The illuminance sensor 330 supplies sensing information according to external illuminance to the driving IC 216 and the backlight driving portion 250 through an I2C communication line 380.

The above-described liquid crystal display 300 in accordance with the third embodiment of the present invention has the driving IC 216 mounted by the COG method on the non-display region B of the liquid crystal panel 203, and the illuminance sensor 330 and the backlight driving portion 250 mounted on the FPC 340 adjacent to the driving IC 216 by the SMT method. Consequently, the liquid crystal display in accordance with the third embodiment of the present invention is able to incorporate the illuminance sensor 330, has a slim thickness, and greatly reduces the length of the I2C communication line 380 used for electrically connecting between the illuminance sensor 330 and the driving IC 216 and between the illuminance sensor 330 and the backlight driving portion 250.

Figure 8:
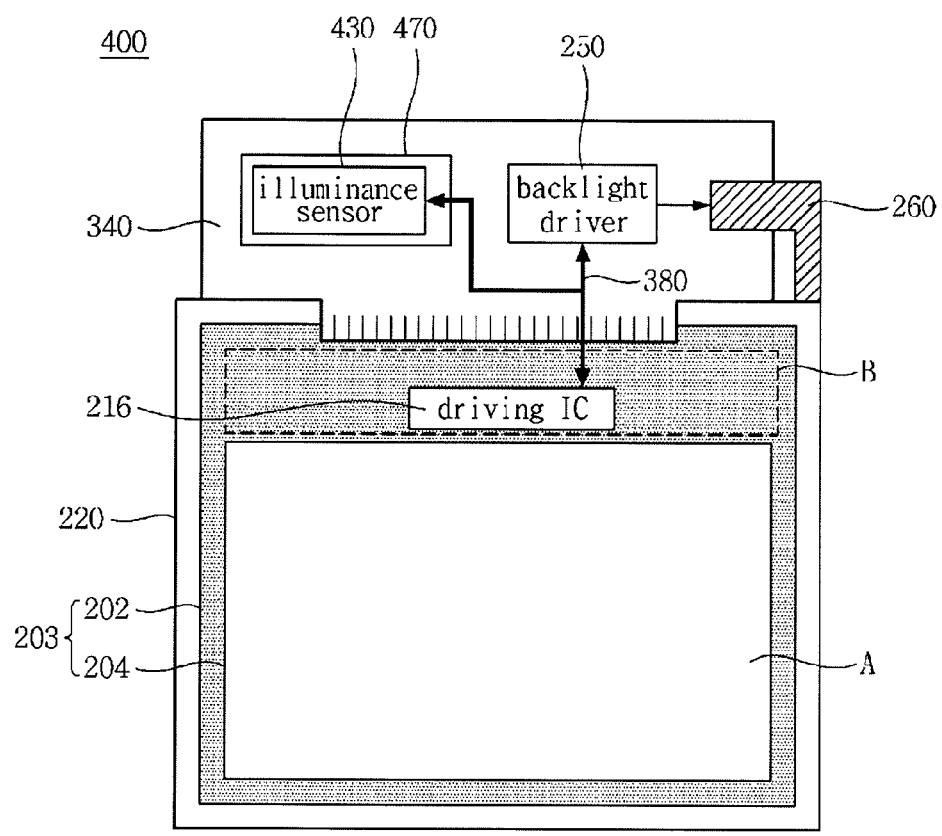
FIG. 8 is a plane view of a liquid crystal display in accordance with a fourth embodiment of the present invention.

FIG. 8 is a plane view of a liquid crystal display in accordance with a fourth embodiment of the present invention.

Referring to FIG. 8, the liquid crystal display 400 in accordance with the fourth embodiment of the present invention is substantially the same as the liquid crystal display 300 in accordance with the third embodiment, except for the arrangement position of a PCB 470 and the mounting position of an illuminance sensor 430. Thus, the other components are given the same reference numerals as those of the liquid crystal display 300 in accordance with the third embodiment, and a detailed description thereof will be omitted. The fourth embodiment may substitute for the third embodiment in the case that, in the third embodiment, it is difficult to directly mounted the illuminance sensor 430 on the FPC 340.

The PCB 470 is mounted by the SMT mounting technology on the FPC 340, outside the non-display region B of the liquid crystal panel 203, and generates a drive signal used to drive the liquid crystal panel 203. The drive signal is supplied to the driving IC 216 of the liquid crystal panel 203 via the FPC 340.

The illuminance sensor 430 is mounted on the PCB 470. For instance, the illuminance sensor 430 may be disposed directly on the PCB 470, and the PCB 470 may be disposed on the FPC 340. The backlight driving portion 250 is disposed on the FPC 340 and as a result, may be disposed on a top side or bottom side of the panel.

Preferably, the illuminance sensor 430 is arranged adjacent to the backlight driving portion 250 in order to reduce the length of a communication line used to connect between the driving IC 216 and the backlight driving portion 250. The illuminance sensor 430 supplies sensing information according to external illuminance to the driving IC 216 and the backlight driving portion 250 through the I2C communication line 380.

The above-described liquid crystal display in accordance with the fourth embodiment of the present invention has the driving IC 216 mounted by the COG method on the non-display region B of the liquid crystal panel 203 and the PCB 470 incorporating the illuminance sensor 430 and the backlight driving portion 250 mounted on the FPC 340 adjacent to the driving IC 216 by the SMT method. Consequently, the liquid crystal display in accordance with the fourth embodiment of the present invention is able to incorporate the illuminance sensor 430, has a slim thickness, and reduces the length of the I2C communication line 380 used for electrically connecting between the illuminance sensor 430 and the driving IC 216 and between the illuminance sensor 430 and the backlight driving portion 250.

As described above, in the liquid crystal display in accordance with embodiments of the present invention, an illuminance sensor can be mounted on the non-display region adjacent to the driving IC by a COG method or other suitable method, or mounted on the FPC adjacent to the backlight driving portion by a SMT method or other suitable method.

For example, according to the embodiments, the driving IC and the illuminance sensor are disposed adjacent to each other in the non-display region over the lower substrate of the liquid crystal panel. In one example, the illuminance sensor is formed directly on the lower substrate of the liquid crystal panel in the non-display region. In another example, the illuminance sensor is formed directly on the FPC in the non-display region.

According to other embodiments, the illuminance sensor and the backlight driving unit are disposed adjacent to each other over the FPC. In one example, the illuminance sensor is formed directly on the FPC. In another example, the illuminance sensor is formed directly on the PCB disposed on the FPC.

Furthermore, the features and components discussed in any of the embodiments may be applied to any other embodiments of the invention, or may be combined with each other. Moreover, although specific methods (e.g., SMT, COG, etc.) have been discussed, the invention encompasses use of other suitable methods to form the above discussed structures of the liquid crystal displays. In addition, the components that correspond to the display region (e.g., pixels, color filters, black matrix, etc.) of the upper and lower substrates can vary depending on the display type or configuration, which are all covered by the present invention.

Consequently, the liquid crystal display is able to incorporate the illuminance sensor, has a reduced thickness, and greatly reduces the length of an I2C communication line (or other line) used for providing electrical connections among one or more of the illuminance sensor, the driving IC, the illuminance sensor, and the backlight driving portion.

It will be understood by those skilled in the art that various changes and modifications may be applicable within a range not departing from the technical idea of the invention. Accordingly, the technical scope of the present invention is not limited to the detailed description of the specification, but should be defined by the accompanying claims.

What is claimed is:

1. A liquid crystal display device comprising:
a liquid crystal panel including upper and lower substrates, divided into an effective display region and a non-display region adjacent to the effective display region, and the lower substrate having a front surface and a back surface;
a backlight unit configured to supply light to the effective display region and being attached to the back surface of the lower substrate;
a backlight driving unit configured to control an operation of the backlight unit;
an illuminance sensor configured to sense light external to the liquid crystal display device;
a driving integrated circuit (IC) configured to control data to be displayed in the effective display region and to adjust gamma characteristics of data to be displayed on the liquid crystal display device based on sensing information from the illuminance sensor; and
a flexible printed circuit (FPC) on which the backlight driving unit is disposed, the driving IC and the illuminance sensor being disposed adjacent to each other in the non-display region of the front surface of the lower substrate, wherein the illuminance sensor is mounted on an extended portion of the FPC that extends to a portion in the non-display region of the front surface of the lower substrate that is other than a portion where the driving IC is mounted, wherein the illuminance sensor and the backlight driving unit are disposed adjacent to each other on the front surface of the lower substrate, and wherein the FPC wraps around one side of the lower substrate and the backlight unit from the front surface of the lower substrate to a back surface of the backlight unit; and
a printed circuit board (PCB) configured to generate a driving signal to drive the liquid crystal panel and connected to the FPC, wherein the PCB is arranged on the back surface of the backlight unit,
wherein the illuminance sensor, the driving IC, and the backlight driving unit are included in the liquid crystal display device,
wherein the illuminance sensor and the driving IC are disposed adjacent to each other on the front surface of the lower substrate to reduce a length of a communication line for electrically connecting between the illuminance sensor and the driving IC and the illuminance sensor and the backlight driving unit are disposed adjacent to each other to reduce a length of a communication line for electrically connecting between the illuminance sensor and the backlight driving unit, and
wherein the backlight driving unit is electrically and directly connected with the illuminance sensor without passing through the driving IC.

2. The liquid crystal display device of claim 1, wherein the illuminance sensor is formed directly on the FPC in the non-display region.

3. The liquid crystal display device of claim 1, wherein the driving IC is mounted on the non-display region by a chip-on-glass (COG) method, and
the backlight driving unit is mounted on the FPC by a surface mounting technology (SMT) method.

4. The liquid crystal display device of claim 1, further comprising:
a communication line configured to provide electrical connections among at least two of the illuminance sensor, the driving IC and the backlight driving unit.

5. The liquid crystal display device of claim 4, wherein the communication line is an inter-integrated circuit (I2C) communication line.

6. The liquid crystal display device of claim 1, wherein the driving IC adjusts signal characteristics of the data to be displayed based on an external light sensing result from the illuminance sensor, and/or the backlight driving unit adjusts light to be generated by the backlight unit based on the external light sensing result from the illuminance sensor.

7. A liquid crystal display device comprising:
   a liquid crystal panel including upper and lower substrates, divided into an effective display region and a non-display region adjacent to the effective display region, and the lower substrate having a front surface and a back surface;
   a backlight unit configured to supply light to the effective display region and being attached to the back surface of the lower substrate;
   a backlight driving unit configured to control an operation of the backlight unit;
   an illuminance sensor configured to sense light external to the liquid crystal display device;
   a driving integrated circuit (IC) disposed in the non-display region over the lower substrate and configured to control data to be displayed in the effective display region and to adjust gamma characteristics of data to be displayed on the liquid crystal display device based on sensing information from the illuminance sensor;
   a flexible printed circuit (FPC) on which the backlight driving unit is disposed; and
   a printed circuit board (PCB) configured to generate a driving signal to drive the liquid crystal panel and connected to the FPC, wherein the PCB is arranged on a back surface of the backlight unit,
   the illuminance sensor and the backlight driving unit being disposed adjacent to each other over the FPC, wherein the illuminance sensor and the driving IC are disposed adjacent to each other on the front surface of the lower substrate, wherein the illuminance sensor, the driving IC, and the backlight driving unit are included in the liquid crystal display device,
   wherein the FPC wraps around one side of the lower substrate and the backlight unit from the front surface of the lower substrate to the back surface of the backlight unit,
   wherein the illuminance sensor and the driving IC are disposed adjacent to each other to reduce a length of a communication line for electrically connecting between the illuminance sensor and the driving IC and the illuminance sensor and the backlight driving unit are disposed adjacent to each other to reduce a length of a communication line for electrically connecting between the illuminance sensor and the backlight driving unit, and
   wherein the backlight driving unit is electrically and directly connected with the illuminance sensor without passing through the driving IC.

8. The liquid crystal display device of claim 7, wherein the illuminance sensor is formed directly on the FPC.

9. The liquid crystal display device of claim 7, wherein the illuminance sensor is formed directly on the PCB.

10. The liquid crystal display device of claim 7, wherein the illuminance sensor is mounted on the FPC by a surface mounting technology (SMT) method, and the backlight driving unit is mounted on the FPC by the SMT method.

11. The liquid crystal display device of claim 7, further comprising:
    a communication line configured to provide electrical connections among at least two of the illuminance sensor, the driving IC and the backlight driving unit.

12. The liquid crystal display device of claim 11, wherein the communication line is an inter-integrated circuit (I2C) communication line.

13. The liquid crystal display device of claim 7, wherein the driving IC adjusts signal characteristics of the data to be displayed based on an external light sensing result from the illuminance sensor, and/or the backlight driving unit adjusts light to be generated by the backlight unit based on the external light sensing result from the illuminance sensor.

* * * * *